United States Patent [19]

Byrd, Jr. et al.

[11] Patent Number: 4,477,861
[45] Date of Patent: Oct. 16, 1984

[54] WATTHOUR METER WITH TAMPER RESISTANT SEAL

[75] Inventors: Thomas M. Byrd, Jr., Cary, N.C.; Khalil F. Aboujaoude, Monroeville, Pa.

[73] Assignee: Westinghouse Electric Corp., Pittsburgh, Pa.

[21] Appl. No.: 434,199

[22] Filed: Oct. 14, 1982

[51] Int. Cl.³ .............................................. H02B 9/00
[52] U.S. Cl. .................................... 361/371; 220/214; 324/110; 292/307 R
[58] Field of Search ............... 206/459, 807; 361/364, 361/369–371; 324/110, 156; 116/307; 220/214, 323, 324, 326; 292/307 A, 307 B, 307 R

[56] References Cited

U.S. PATENT DOCUMENTS

| | | | |
|---|---|---|---|
| 2,033,371 | 3/1936 | Benaggio | 292/307 B |
| 2,914,354 | 11/1959 | Moberg | 292/307 R |
| 3,628,096 | 12/1971 | Drew, Jr. | 324/156 |
| 3,846,677 | 11/1974 | Keever | 324/110 |
| 3,928,788 | 12/1975 | Finner | 324/156 |
| 4,416,478 | 11/1983 | Canney | 292/307 R |

Primary Examiner—G. P. Tolin
Attorney, Agent, or Firm—L. P. Johns

[57] ABSTRACT

A watthour meter enclosure with tamper resistance means characterized by a meter cover and a meter base assembled for preventing unlocking rotation of the cover and including locking means between the base and cover for preventing unlocking and/or for indicating surreptitious tampering if it occurs.

6 Claims, 8 Drawing Figures

WATTHOUR METER WITH TAMPER RESISTANT SEAL

BACKGROUND OF THE INVENTION

1. Field of the Invention

This invention relates to improved seals for holding a container and cover together and, more particularly, it pertains to mating peripheral surfaces of a watthour meter cover and base assembly for preventing unlocking rotation of the cover and base.

2. Description of the Prior Art

Presently, watthour meters usually include a seal for holding the cover securely on the meter base for preventing tampering with the meter. One seal consists of an aluminum "T" shape with a notch near its tip. The post of the "T" seal includes a tip which is inserted through aligned openings in the rim and base and the tip is bent backward at the notch for installation in the meter. The tip is designed to break if bent straight, then back over, indicating the meter may have been opened. Such a seal is disclosed in U.S. Pat. No. 2,914,354.

Another seal which is used for watthour meters includes a lead plug with captive stranded wire which wire is carefully threaded through the base and rim and around the lead plug for installation into the meter. This seal holds the cover securely on the base but is not cost effective due to the long time needed for installation.

SUMMARY OF THE INVENTION

In accordance with this invention, a tamper resistant watthour meter comprises a base for supporting a watthour meter movement and a cup-shaped cover therefor. The base and the cover comprise radial mating side surfaces with the cover also comprising a peripheral rim surrounding the periphery of the base. Interlocking means between said surfaces are provided by which locking and unlocking occurs by reverse rotation together of the base and cover. Sealing means for securing the base and cover together are provided which include aligned aperture means in the rim and the base when in the locked position, and the sealing means also comprising a formed wire extending between the aligned apertures and a lead sleeve which when compressed contains embedded end portions of the wire therein.

The advantage of the device of this invention is that the shape of the wire permits easy installation, provides for secure locking action, and resists tampering which, if attempted, leaves visible evidence thereof.

DESCRIPTION OF THE PREFERRED EMBDDIMENTS

The use of a seal for holding two elements or parts together is applicable with different types of related examples or parts. For example, a seal is commonly employed to retain covers on a container, such as a milk can, or a watthour electric meter. Accordingly, although the following description involves a watthour meter, it is understood that the invention is not limited to the particular product disclosed.

Figure 1:
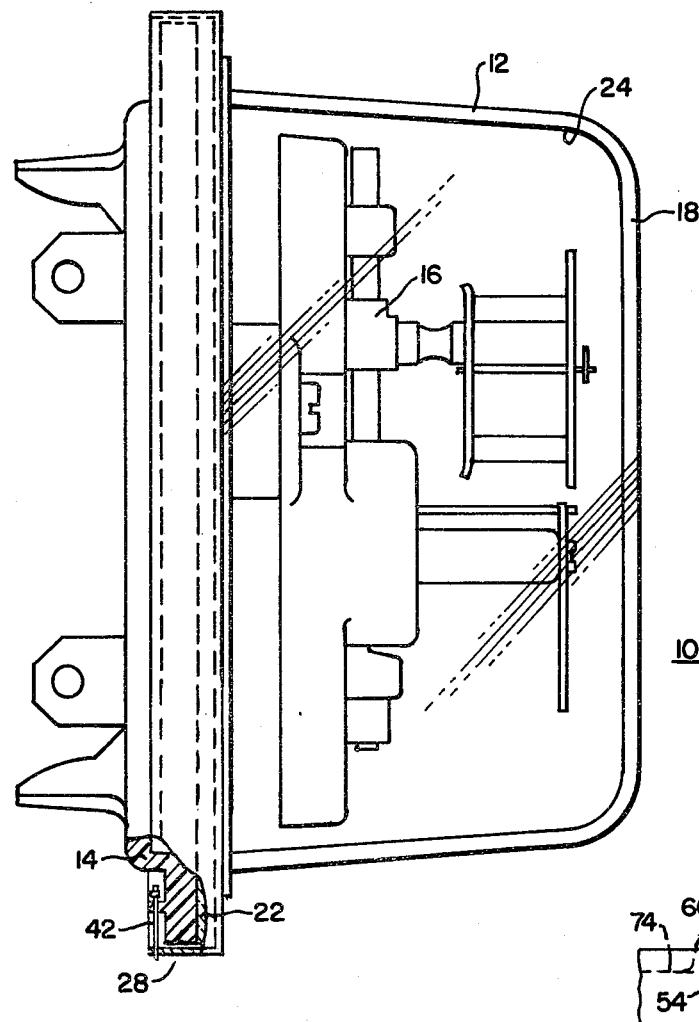
FIG. 1 is a side elevational view of a watthour meter.

A self contained watthour meter is generally indicated at 10 (FIG. 1) which comprises a cover 12 and a base 14. An induction watthour meter movement 16 is supported by the base 14 and contained within the cover 12. The cover 12 is a suitable molded cup-shaped member composed of either glass or a polycarbonate plastic. The cover 10 includes a closed forward end 18 and a rear open end 20 where a circular mounting flange 22 extends radially outward to define the outer periphery at the rear open end of the cover 12. When the cover 12 is attached at the flange 22 to the base 14, the meter movement 16 is enclosed within a protective chamber 24 within the surfaces of the cover and base.

Figure 2:
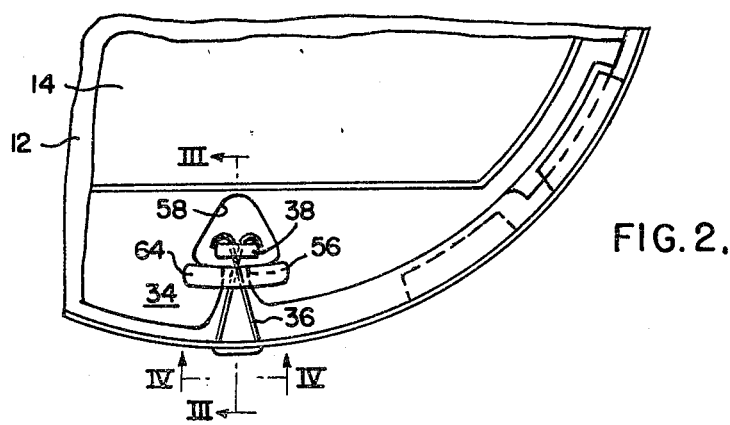
FIG. 2 is a fragmentary elevational view of the back of an electric meter and a cover therefor, illustrating the tamper resistant seal in place for holding the cover against removal.
Figure 3:
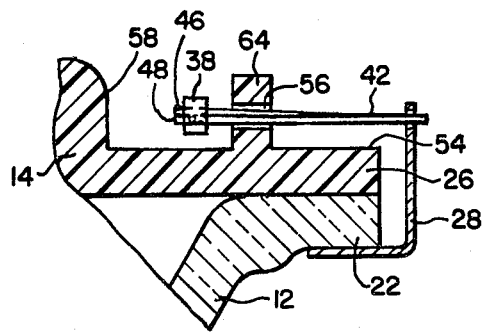
FIG. 3 is a fragmentary sectional view taken on the line III—III of FIG. 2.

The base 14 is comprised of a dielectric material, such as a plastic, and includes a rear peripheral radial flange 26 which is in mating abutment with flange 22. As shown in FIGS. 2 and 3 a metal locking rim 28 extends rearwardly from the flange 22 and circumvents the peripheral ends of the flanges 22, 26. The rim includes a plurality, such as three, inwardly-extending fastening lugs at equally spaced positions around the rim. Mounting flange 22 likewise include fastening lugs which are comparable in number and spacing to the lugs in which cooperate therewith by rotation to engage and disengage the cover 12 and base 14 in locked and unlocked positions, such as a bayonet-lock type of interlocking means for retaining the base in place next to the peripheral flange 22.

Figure 5:
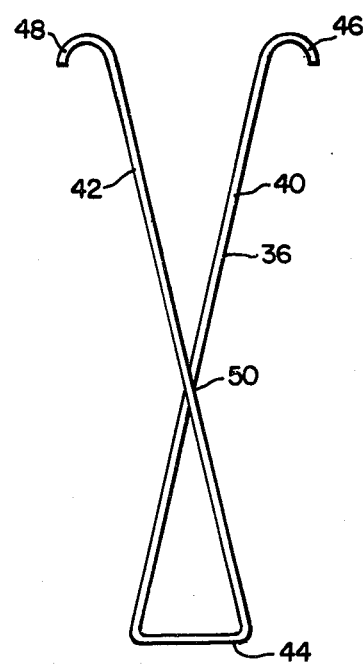
FIG. 5 is an enlarged plan view of the formed sealing wire.
Figure 7:
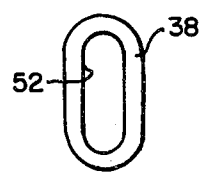
FIG. 7 is an end view taken on the line VII—VII of FIG. 6.
Figure 6:
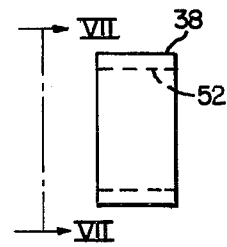
FIG. 6 is an end view of a lid sleeve.

In accordance with this invention sealing means for securing the base and the rim in place are provided. The sealing means are generally indicated at 34 and comprise a formed wire-like member or wire 36 and a deformable body 38. The wire 36 (FIG. 5) is formed and include elongated legs 40, 42 and a bight portion 44. The extremities of the legs 40, 42 have similar outturned hooks 46, 48, respectively. The leg portions 40, 42 intersect at 50. Although the elongated wire-like member 36 is preferably comprised of metallic wire, it may be comprised of another material, such as resin, which is highly resistant to deformation. The preferred material for the wire 36 is stainless steel which is corrosive resistant and is brittle, whereby an attempt to straighten any deformed parts of the wire, such as legs 40, 42, or bight portion 44, causes the wire to break, thereby indicating an attempt to remove the cover 12 from the base 14. The wire 36 may vary from about 0.018 to 0.028 inch diameter with a preferred diameter of 0.023 inch. The deformable body 38 (FIGS. 6, 7) is preferably a sleeve of a deformable metal or soft alloy or pliable material, such as lead, having a hole 52 through which the hooks 46, 48 are inserted prior to the forming of the body.

Figure 4:
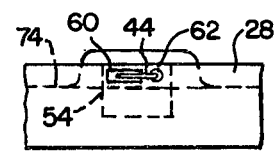
FIG. 4 is a fragmentary view taken on the line IV—IV of FIG. 2.

As shown in FIGS. 2, 3, the base 14 comprises a recess 54, an opening 56, and a cavity 58. When assembled in a sealing condition (FIGS. 2, 3) the legs 40, 42 extend through opening means (FIG. 4), including a slot 60 and a hole 62 in the locking rim 28. The bight portion 44 is disposed along the outer surface of the rim between the slot 60 and hole 62. The legs 40, 42 extend inwardly into the generally V-shaped recess 54, through the hole 56, and into the cavity 58. The hole 56 is slightly larger than the hooks 46, 48 to facilitate insertion during assembly. The hooks 46, 48 are inserted through the hole 52 of the body 38 and within the cavity 58. The body 38 is then compressed or squeezed with the end portions 40, 42 of the legs embedded therein and with the hooks 46, 48 perferably extended through the other side of the deformed body. Reinforcement of the hole 56 is provided by an enlarged ridge or projection 64 (FIGS. 2, 3).

During assembly one hook 46 is inserted through the hole 62 while the other leg 42 is twisted to enable insertion of the hook 48 through the slot 60. The wire 36 is squeezed to superimpose one hook 48 over the other hook 46 for insertion through the hole 56 and for insertion through the hole 52 of the body 38. Upon release of the wire 36 the intersection 50 occurs in or near the hole 56. The body 38 is then deformed with the hooks 46, 48 preferably extending outside of the deformed body on the side of the body opposite the hole 56.

Figure 8:
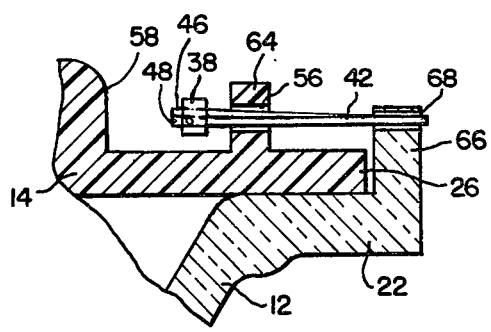
FIG. 8 is a sectional view of another embodiment of the invention.

Another embodiment of the invention is shown in FIG. 8 in which similar parts have similar reference numbers. In the embodiment of FIG. 8 the cover 12 comprises a peripheral flange 66 instead of a metal locking ring 28. In other respects the flange 66 is similar to that of the rim 28 in that it includes aperture means 68 similar to the slots 60 and 62 in the rim 28.

When assembled in the locked and sealed position, the sealing means 34 provide considerable resistance against relative rotation of the cover 12 and base 14. Indeed, if a force is applied sufficient to disengage the interlocking lugs, the sealing means 34 is permanently deformed or broken, thereby providing evidence of probably tampering with the meter movement 16.

In conclusion, the uniquely formed wire and lead sleeve provide a tamper resistant means for either preventing removal of the cover from the base or indicating an attempt to remove the cover surreptitiously. The sealing means is cost effective and shows obvious signs of tampering.

What is claimed is:

1. A watthour meter container comprising:
   a base assembly supporting a watthour meter movement and including circularly arcuate, circumferentially spaced, attachment lugs extending radially at the outer periphery thereof, which lugs have forward and rear side radial surfaces;
   a cup-shaped cover including a closed forward end and an open rear end, and including a circular mounting flange extending radially outward at the rear open end, with a rear radial side surface mating with the front radial side surface of the attachment lugs, and including a locking rim carrying tabs rotationally attaching and locking the cover to the attachment lugs to enclose the watthour meter movement within a protective container;
   the base and the rim comprising substantially aligned aperture means; and
   sealing means securing the base and cover body in place and including a wire and a deformable body, the wire extending through the aperture means with opposite end portions of the wire being embedded within the body;
   whereby rotation of either of the base assembly or the cup-shaped cover with respect to the other causes breakage of the sealing means.

2. The watthour meter container of claim 1 in which aperture means includes a pair of holes in the rim and an opening in the base assembly, the wire including opposite end portions and a bight portion with each leg portion extending through corresponding pairs of holes in the rim and with both leg portions extending through the opening in the base assembly.

3. The watthour meter container of claim 2 in which the base assembly comprises a recess aligned with the holes and the opening and through which the leg portions extend.

4. The watthour meter container of claim 3 in which the base comprises a cavity on the side of the opening opposite the recess and the assembly of the wire extremities and the body being disposed in the cavity.

5. The watthour meter container of claim 4 in which the leg portions cross each other in the opening.

6. The watthour meter container of claim 5 in which the deformable body is a lead sleeve in which the leg extremities are booked portions contained within the body.

* * * * *